April 12, 1932.  D. MAPES  1,853,629
RECOIL PREVENTING SAFETY CAP
Filed Nov. 14, 1929
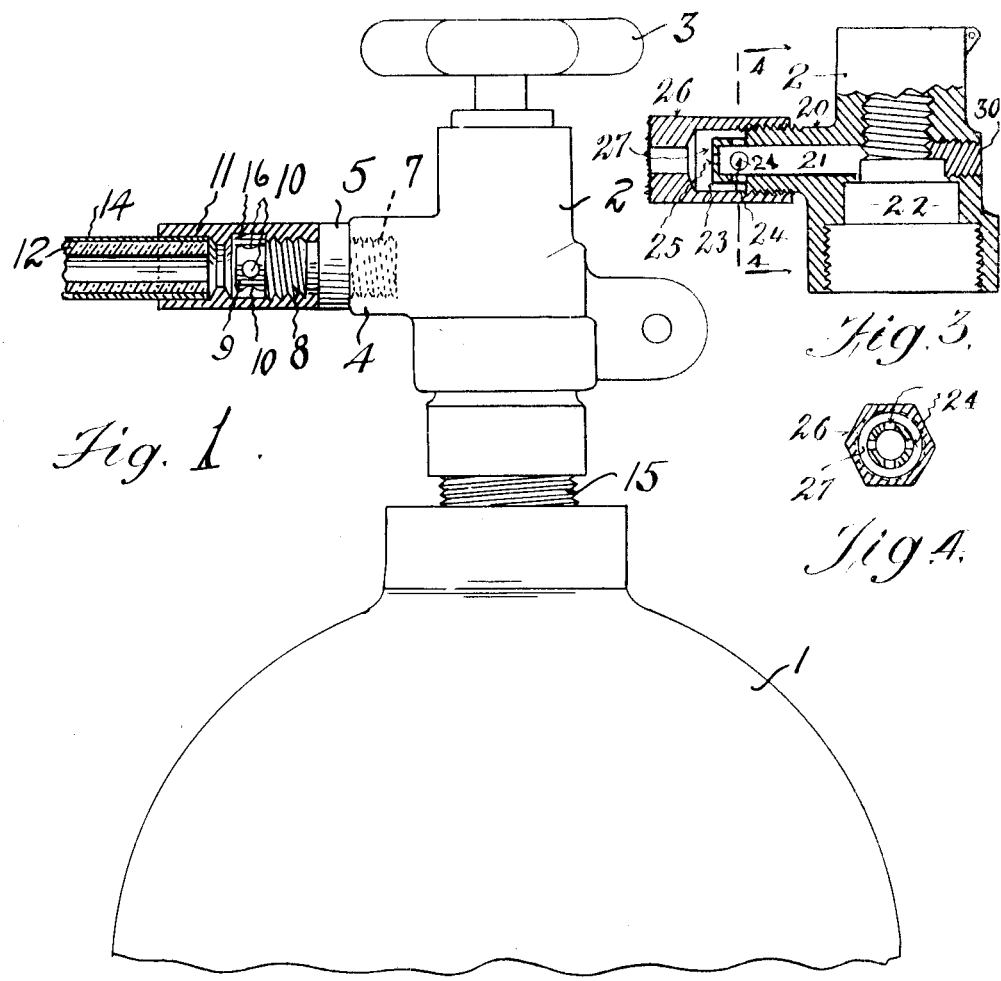
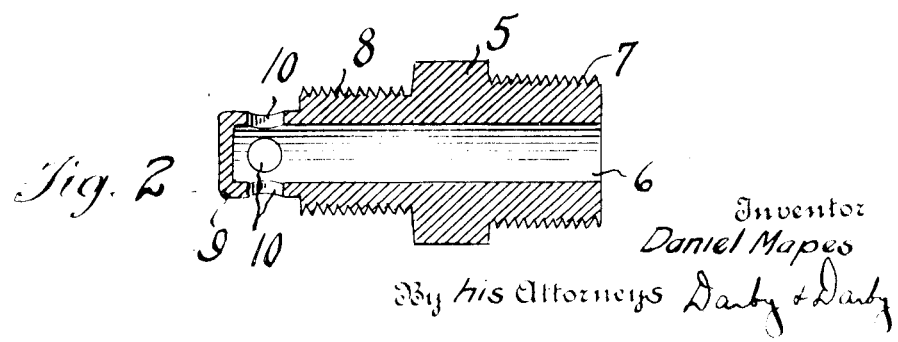

Patented Apr. 12, 1932

1,853,629

UNITED STATES PATENT OFFICE

DANIEL MAPES, OF MAMARONECK, NEW YORK, ASSIGNOR TO WALTER KIDDE & COMPANY, INC., OF NEW YORK, N. Y., A CORPORATION OF NEW YORK

RECOIL PREVENTING SAFETY CAP

Application filed November 14, 1929. Serial No. 407,048.

This invention relates to re-coil prevention safety caps used in connection with portable high pressure gas cylinders and the like.

One of the objects of this invention is the provision of a new form of re-coil prevention safety cap which may be permanently but detachably applied to high pressure gas cylinders.

Another object of the invention is to so construct this safety cap that a hose coupling may be applied thereover to establish communication between the hose and the interior of the gas cylinder without removing the safety cap.

Another object of this invention is the provision of a safety cap having discharge ports arranged so that the discharge pressure is balanced to prevent re-coil.

A still further object of this invention is to provide for high pressure gas cylinders, safety caps which need not be removed in connecting a hose to the cylinder, thus eliminating the possibility of losing the safety cap or not having it in place at all times when needed.

Another object of this invention is to provide a structure having these advantages which is relatively simple and adapted for rapid and cheap manufacturing and yet efficient in use.

These and other objects as will appear from the following disclosure are secured by means of the device of this invention.

This invention resides substantially in the combination, construction, arrangement and relative location of parts all as will be described in greater detail hereinafter.

Referring to the drawings—

Figure 1 is a side elevational view in enlarged form of the upper portion of a portable gas container, the control discharge valve therefor, the safety cap of this invention and a hose and coupling in cross-section applied thereto;

Fig. 2 is a longitudinal cross-sectional view through the safety cap;

Fig. 3 is a view partly in vertical cross-sectional view of a modified structure showing the safety cap formed integrally with the valve body and a conducting pipe attached thereto;

Fig. 4 is a cross-sectional view taken on the line 4—4 of Fig. 3.

In the use of high pressure gas cylinders such as used with fire extinguishing apparatus it is necessary to insure that gas is not permitted to freely discharge from the cylinder because of the reaction produced by the rapidly discharging high pressure gas which sets the cylinder in motion if it is not secured against movement. As a matter of fact, if the control valve of such a high pressure cylinder is opened so that the gas is permitted to escape freely and rapidly the gas cylinder if unsecure is liable to be impelled with great force with the result that injury and damage may be caused. In order to prevent such an occurrence it has been proposed therefore to provide in the outlet of the valve which controls the discharge of gas from the container a suitable, detachable safety cap which is secured in place when there is no pipe connection to the container so that should the gas valve be opened the gas escapes in a manner to prevent any serious reaction on the container. Such devices are known as recoil preventing safety caps. These devices as now known are, however, of such construction and form that they must be removed from the control valve when a pipe or hose connection is made thereto and, as a result, they are liable to and often do become lost or misplaced so that they are not handy when the pipe or hose is disconnected. As a result the safety cap is often not in place and, hence, if the control valve is opened for any purpose injury is liable to result. The prime object then of this invention is to provide a re-coil safety cap which is always in place and which remains in place even when a pipe or hose is connected to the control valve.

For a better understanding of the construction of the invention reference is now made to the drawings. The upper end of the high pressure gas container or cylinder is shown at 1 to which is secured by a hollow threaded extension 15 the usual control valve 2 having the control handwheel 3. The valve body is provided with a hollow extension 4 communicating with the interior thereof into which is secured the safety cap 5 of this invention. This cap is provided with a central passage therethrough as shown at 6 which is closed by the end wall as at 9. One end of the safety cap is externally threaded as at 7 to be secured to the control valve as shown in Figure 1. At the other end are provided the external threads 8 beyond which extends a wall of less diameter closed as described by the end wall 9. This extending wall is provided with two or more openings 10 which occur in pairs diametrically opposite to each other. The hose 12 which may be of any suitable material is provided with a flexible casing 14 of metal which may be soldered or sweated into the interior of the coupling 11. Of course, any suitable hose or pipe may be employed as, for example, an all metal flexible hose, and it may be secured to the coupling in any well known manner. The coupling 11 has a passage all the way therethrough which is enlarged at the point where the apertured extension of the safety cap 5 is to provide a chamber 16 there around. The other end of the coupling 11 is internally threaded to engage the external threads 8 of the safety cap.

With such a construction the safety cap 5 may always remain in place in the discharge port of the control valve 2 so that when the coupling and pipe or hose is removed the safety cap will be in place to carry out its intended function. The pipe or hose may be connected thereto by the coupling 11 by screwing the coupling to the external threads 8 without removing the safety cap. The chamber 16 permits ready discharge of the gas through the ports 10 when the valve 2 is opened and delivery therefrom to the pipe or hose connection. This construction insures that the safety cap is always in place. The discharge ports 10 are provided in pairs diametrically opposite so that the gas escaping at high pressure therethrough will be balanced by the reaction of each discharge stream on the one directly opposite it, thereby eliminating any reaction on the container.

In the modified form of construction shown in Figs. 3 and 4 the valve body 2 is shown provided with the integral projection 20 having a central passage 21 therethrough which is provided with an end wall at one end which opens into the space 22 of the valve body in which the seat of the valve lies (not shown). The outer end of the extension 20 is reduced in diameter somewhat and is closed as shown at 23. The reduced portion 23 is provided with a number of pairs of openings 24 which openings of each pair are diametrically opposite to each other. If desired the end wall may be provided with a small opening 25 as shown to aid in the discharge of the gas and liquid without impairing the advantages of this construction. A coupling hose, conduit, pipe, or the like, 26, is provided with an enlarged recess at the end and engages the extension 20 by means of threads as shown. The reduced portion 23 of extension 20 lies in the chamber 22 formed in the pipe 26. The valve body is provided with a threaded opening in alignment with the passage 21 so that this passage may be drilled out during the manufacture of the device through the opening. This opening is then closed by the plug 30 as shown.

From the aforegoing disclosure it will be apparent that I have embodied certain principles of construction and operation in a device of the nature described and have illustrated one practical structure for purposes of description. I am, of course, aware that those skilled in the art will readily appreciate other practical forms of devices embodying these principles of construction and operation without departing from the scope of this invention and I do not, therefore, desire to be strictly limited to the disclosure as given for purposes of illustration but rather to the spirit of the appended claims.

What I seek to secure by United States Letters Patent is:

1. The combination with a high pressure gas container and control valve therefor, of a re-coil preventing safety cap detachably secured thereto and arranged to have a hose coupling attached thereto to permit delivery of gas to the hose from the container without the necessity of removing the safety cap.

2. In a device of the type described, the combination with a high pressure gas container and a control valve therefor, of a safety cap comprising a hollow member closed at one end with a plurality of apertures adjacent the closed end and having means for securing it to the control valve, and means to adapt it for connection with a hose coupling.

3. In a device of the type described, the combination of a high pressure gas container and a control valve therefor having a discharge port, of a safety cap secured to said discharge port, said safety cap having a clear passage therethrough, and a plurality of apertures in the wall thereof adjacent the closed end.

4. In a device of the type described, the combination with a high pressure gas container and a control valve therefor having a discharge port, of a safety cap secured in said discharge port, said safety cap having a clear passage therethrough, and one or more pairs of diametrically arranged apertures in the wall thereof adjacent the closed end.

5. In a device of the type described, the combination with a high pressure gas container and a control valve therefor having a discharge port, of a safety cap secured in said discharge port, said safety cap having a clear passage therethrough and one or more pairs of diametrically arranged apertures in the wall thereof adjacent the closed end, and means on the exterior thereof to which a coupling may be secured, said apertures being free for discharge into the coupling.

6. In an arrangement as described, the combination with a high pressure gas container and control valve secured thereto having a discharge port therein, of a safety cap in said discharge port having a central passage closed at the outer end and having a plurality of apertures in the wall thereof adjacent the closed end, a coupling having a passage therethrough secured to said safety cap, said coupling having a space in the interior thereof adjacent said apertures into which the gas from the container may be discharged through the apertures.

7. In an arrangement as described, the combination with a high pressure gas container and control valve secured thereto having a discharge port therein, of a safety cap in said discharge port having a central passage closed at the outer end and having a plurality of apertures in the wall thereof adjacent the closed end, a coupling having a passage therethrough secured to said safety cap, said coupling having a space in the interior thereof adjacent said apertures into which the gas from the container may be discharged through the apertures, and a hose connected to said coupling and opening into the interior thereof.

8. A re-coil preventing safety cap of the type described, comprising a body member externally threaded adjacent each end, said body member having a central passage closed by an end wall, and a plurality of apertures in the wall adjacent the closed end.

9. A re-coil preventing safety cap of the type described, comprising a thimble like body member externally threaded near each end, the closed end of the body member being of less diameter than the adjacent threaded portion, and having one or more pairs of diametrically opposed apertures in the wall thereof near the closed end.

10. The combination with a high pressure gas container and control valve therefor, of a re-coil preventing safety device arranged to have a conducting means attached thereto to permit the delivery of gas to the conducting means from the container without the necessity of removing the re-coil preventing device.

11. The combination with a high pressure gas container and a control valve therefor, of a re-coil preventing safety cap formed integrally with the valve and arranged to have a conducting means attached thereto, said safety cap having a series of diametrically opposed openings by means of which a discharge can take place from the container into the conducting means.

12. In a device of the type described, the combination comprising a high pressure gas container, a control valve secured thereto and a safety cap formed integrally with the control valve and having a plurality of balanced apertures therein and a conducting means secured to said extension in a manner to enclose the opening so that discharge can take place directly into the conducting means.

13. The combination with a high pressure gas container, a control valve therefor and a conduit in communication with the control valve, of means connected to the conduit so that the gas flows therethrough, for minimizing recoil when the high pressure gas is escaping.

14. The combination with a high pressure gas container, a control valve therefor and a conduit in communication with the control valve, of means connected to the conduit for producing a balanced discharge of the gas when the valve is open to minimize the recoil effect.

In testimony whereof I have hereunto set my hand on this 9th day of November A. D., 1929.

DANIEL MAPES.